United States Patent
Bent et al.

(10) Patent No.: US 9,069,778 B1
(45) Date of Patent: Jun. 30, 2015

(54) CLOUD OBJECT STORE FOR ARCHIVE STORAGE OF HIGH PERFORMANCE COMPUTING DATA USING DECOUPLING MIDDLEWARE

(71) Applicant: EMC Corporation, Hopkinton, MA (US)

(72) Inventors: John M. Bent, Los Alamos, NM (US); Sorin Faibish, Newton, MA (US); Gary Grider, Los Alamos, NM (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 56 days.

(21) Appl. No.: 13/730,097

(22) Filed: Dec. 28, 2012

(51) Int. Cl.
G06F 7/00 (2006.01)
G06F 17/30 (2006.01)
G06F 11/14 (2006.01)

(52) U.S. Cl.
CPC ...... *G06F 17/30073* (2013.01); *G06F 11/1482* (2013.01)

(58) Field of Classification Search
CPC .......... G06F 2201/84; G06F 17/30088; G06F 11/1451; G06F 17/30; G06F 11/1461; G06F 11/1469
USPC .................................................. 707/665, 649
See application file for complete search history.

(56) References Cited

U.S. PATENT DOCUMENTS

2013/0159364 A1    6/2013   Grider et al.
2014/0149591 A1*   5/2014   Bhattacharya et al. ....... 709/226

OTHER PUBLICATIONS

Bent et al., PLFS: A Checkpoint Filesystem for Parallel Applications, SC09 Nov. 14-20, Portland, Oregon, pp. 1-12.
John Bent, et al., "PLFS: A Checkpoint Filesystem for Parallel Applications", Association for Computing Machinery, SC09 (Nov. 2009).
Mendel Rosenblum et al., "The Design and Implementation of a Log-Structured File System", ACM Transactions on Computer Systems, 10:1-15 (1992).

* cited by examiner

*Primary Examiner* — Truong Vo
(74) *Attorney, Agent, or Firm* — Ryan, Mason & Lewis, LLP

(57) ABSTRACT

Cloud object storage is enabled for archived data, such as checkpoints and results, of high performance computing applications using a middleware process. A plurality of archived files, such as checkpoint files and results, generated by a plurality of processes in a parallel computing system are stored by obtaining the plurality of archived files from the parallel computing system; converting the plurality of archived files to objects using a log structured file system middleware process; and providing the objects for storage in a cloud object storage system. The plurality of processes may run, for example, on a plurality of compute nodes. The log structured file system middleware process may be embodied, for example, as a Parallel Log-Structured File System (PLFS). The log structured file system middleware process optionally executes on a burst buffer node.

25 Claims, 6 Drawing Sheets

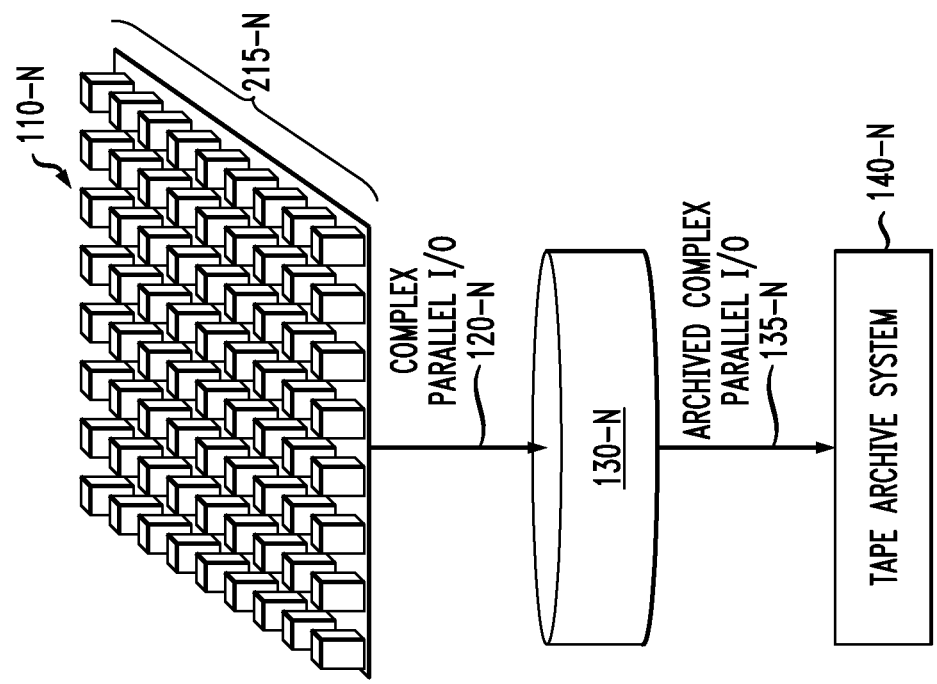
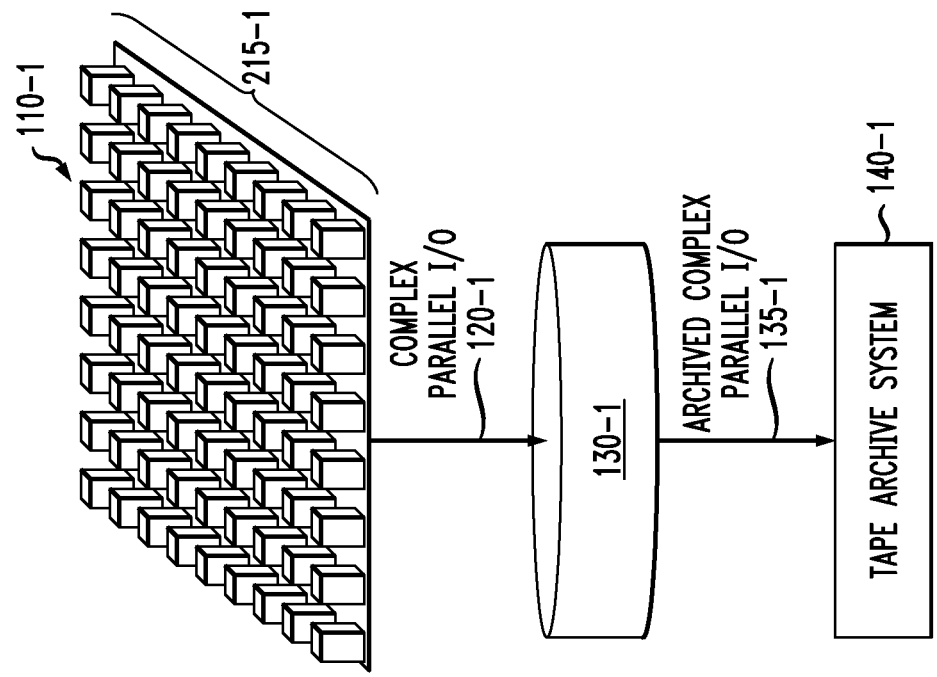
FIG. 1
PRIOR ART
100

```
/**
 * IOStore: A pure virtual class for IO manipulation of a backend store
 *
 * return values:
 * - functions that return signed ints: 0 =success, otherwise -err
 * - otherwise the success/-err info is returned as a param
 *
 * this also applies for functions in the IOSHandle and IOSDirHandle classes.
 */
class IOStore {
public:
  virtual int Access(const char *bpath, int mode)=0;
  virtual int Chown(const char *bpath, uid_t owner, gid_t group)=0;
  virtual int Chmod(const char *bpath, mode_t mode)=0;
  int Close(IOSHandle *handle);           /* inlined below */
  int Closedir(class IOSDirHandle *dhandle); /* inlined below */
  virtual int Lchown(const char *bpath, uid_t owner, gid_t group)=0;
  virtual int Lstat(const char *bpath, struct stat *sb)=0;
  virtual int Mkdir(const char *bpath, mode_t mode)=0;
  /* Chuck, this open takes args that are very POSIX specific */
  virtual IOSHandle *Open(const char *bpath, int flags, mode_t, int &ret)=0;
  virtual IOSDirHandle *Opendir(const char *bpath, int &ret)=0; .
  virtual int Rename(const char *frombpath, const char *tobpath)=0;
  virtual int Rmdir(const char *bpath)=0;
  virtual int Stat(const char *bpath, struct stat *sb)=0;
  virtual int Statvfs( const char *path, struct statvfs* stbuf )=0;
  virtual int Symlink(const char *bpath1, const char *bpath2)=0;
  virtual ssize_t Readlink(const char *bpath, char *buf, size_t bufsize)=0;
  virtual int Truncate (const char *bpath, off_t length)=0;
  virtual int Unlink(const char *bpath)=0;
  virtual int Utime(const char *bpath, const struct utimbuf *times)=0;
  virtual ~IOStore() { }

/* two simple compat APIs that can be inlined by the compiler */
  class IOSHandle *Creat(const char *bpath, mode_t mode, int &ret) {
    return(Open(bpath, O_CREAT|O_TRUNC|O_WRONLY, mode, ret));
  };
  class IOSHandle *Open(const char *bpath, int flags, int &ret) {
    return(Open(bpath, flags, 0777, ret));
  };
};
```

FIG. 4B

```
/*
 * IOSHandle: iostore open file handle. this is the iostore version
 * of the posix int file descriptor. all functions that operation on
 * file descriptors belong here.
 */
class IOSHandle {
private:
  virtual int Close(void)=0;
  friend int IOStore::Close(IOSHandle *handle);

public:
  virtual int Fstat(struct stat *sb)=0;
  virtual int Fsync(void)=0;
  virtual int Ftruncate(off_t length)=0;
  virtual int GetDataBuf(void **bufp, size_t length)=0;
  virtual ssize_t Pread(void *buf, size_t nbytes, off_t offset)=0;
  virtual ssize_t Pwrite(const void *buf, size_t nbytes, off_t offset)=0;
  virtual ssize_t Read(void *buf, size_t offset)=0;
  virtual int ReleaseDataBuf(void *buf, size_t length)=0;
  virtual off_t Size(void)=0;
  virtual ssize_t Write(const void *buf, size_t nbytes)=0;
};
```
⎬ 450

```
/**
 * IOSDirHandle: iostore open directory handle. this is the iostore
 * version of a DIR*.
 */
class IOSDirHandle {
private:
  virtual int Closedir(void)=0;
  friend int IOStore::Closedir(IOSDirHandle *handle);

public:
  virtual int Readdir_r(struct dirent *, struct dirent **)=0;
};
```
⎬ 475

500

CLOUD OBJECT STORE FOR ARCHIVE STORAGE OF HIGH PERFORMANCE COMPUTING DATA USING DECOUPLING MIDDLEWARE

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

CROSS-REFERENCE TO RELATED APPLICATION

The present application is related to U.S. patent application Ser. No. 13/730,058, filed Dec. 28, 2012, entitled "Cloud Object Store for Checkpoint of High Performance Computing Applications Using Decoupling Middleware."

FIELD

The field relates generally to data storage, and more particularly, to cloud storage for high performance computing applications.

BACKGROUND

High-performance computing (HPC) techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources.

High-performance computing applications typically require that simulation checkpoints and results are archived for long periods of time (such as several years). A small number of highly complex parallel file systems are typically employed to store the archived checkpoints and results. Such file systems are not economical in the sense that they need to solve challenging problems for a relatively small market.

An increasing number of companies and other enterprises are reducing their costs by migrating portions of their information technology infrastructure to cloud service providers. For example, virtual data centers and other types of systems comprising distributed virtual infrastructure are coming into widespread use.

Cloud object storage amortizes the software development and hardware infrastructure costs across a much larger number of parties, thereby reducing the cost significantly. In cloud-based information processing systems, enterprises in effect become tenants of the cloud service providers. However, by relinquishing control over their information technology resources, these cloud tenants expose themselves to additional potential security threats. For example, a given tenant may be inadvertently sharing physical hardware resources of a cloud computing environment with other tenants that could be competitors or attackers. Cloud storage systems have addressed such security concerns with multi-tenancy mechanisms.

A need exists for improved storage of archived checkpoints and results for high-performance computing applications.

SUMMARY

Illustrative embodiments of the present invention provide cloud object storage for archived data, such as checkpoints and results, of high performance computing applications using a middleware process. According to one aspect of the invention, a method is provided for storing a plurality of archived files generated by a plurality of processes in a parallel computing system, by obtaining the plurality of archived files from the parallel computing system; converting the plurality of archived files to objects using a log structured file system middleware process; and providing the objects for storage in a cloud object storage system.

The plurality of processes may run, for example, on a plurality of compute nodes. The plurality of files may comprise, for example, checkpoint files generated by the plurality of compute nodes. The log structured file system middleware process may be embodied, for example, as a Parallel Log-Structured File System (PLFS). The log structured file system middleware process optionally executes on a burst buffer node.

Advantageously, illustrative embodiments of the invention provide techniques for storing checkpoint files in a parallel computing system using a middleware process. These and other features and advantages of the present invention will become more readily apparent from the accompanying drawings and the following detailed description.

BRIEF DESCRIPTION OF THE DRAWINGS

FIG. 1 illustrates an exemplary conventional approach for storing archived data in a high performance computing application;

FIGS. 4A and 4B, collectively, illustrate exemplary code for an Abstract Storage Interface used to transform archived complex parallel file-based input/output for storage on a storage system.

DETAILED DESCRIPTION

Illustrative embodiments of the present invention will be described herein with reference to exemplary cloud storage systems and associated computers, servers, storage devices and other processing devices. It is to be appreciated, however, that the invention is not restricted to use with the particular illustrative system and device configurations shown. Accordingly, the term "cloud storage system" as used herein is intended to be broadly construed, so as to encompass, for example, private or public cloud systems distributed over multiple geographically-dispersed locations, as well as other types of storage systems comprising multiple physical sites.

According to one aspect of the invention, cloud object storage is employed for storing archived data, such as checkpoints and results, of high performance computing applications using decoupling middleware. Aspects of the present invention recognize that existing cloud object storage application programming interfaces (APIs) are not sufficient for the highly complex parallel IO workloads in HPC. Therefore, a cloud object storage API is coupled with software middleware that transparently converts complex parallel Input/Output (I/O) file workloads into object-based workloads for storage in a cloud storage system.

FIG. 1 illustrates an exemplary conventional approach 100 for storing archived data, such as checkpoints and results, in a high performance computing application. As shown in FIG. 1, one or more high performance computing applications executing on one or more compute node sites 110-1 through 110-N generate complex parallel I/O 120-1 through 120-N, such as a plurality of archived checkpoint and results files. The compute node(s) 110 execute a plurality of jobs 215 for one or more clients (not shown) in parallel. The complex parallel I/O 120 is stored in a corresponding parallel file system 130-1 through 130-N associated with the high performance computing application 110-1 through 110-N.

As indicated above, high-performance computing applications typically require that simulation checkpoints, results and other data are archived, for example, in a corresponding tape archive system 140-1 through 140-N, for long periods of time (such as several years). The archived complex parallel I/O 135-1 through 135-N comprised of the data to be archived is thus typically copied to the corresponding tape archive system 140-1 through 140-N. Thus, aspects of the invention employ cloud object storage to store archived data of high performance computing applications, such as the high performance computing applications executing on the sites 110-1 through 110-N of FIG. 1, using a decoupled middleware process.

Figure 2:
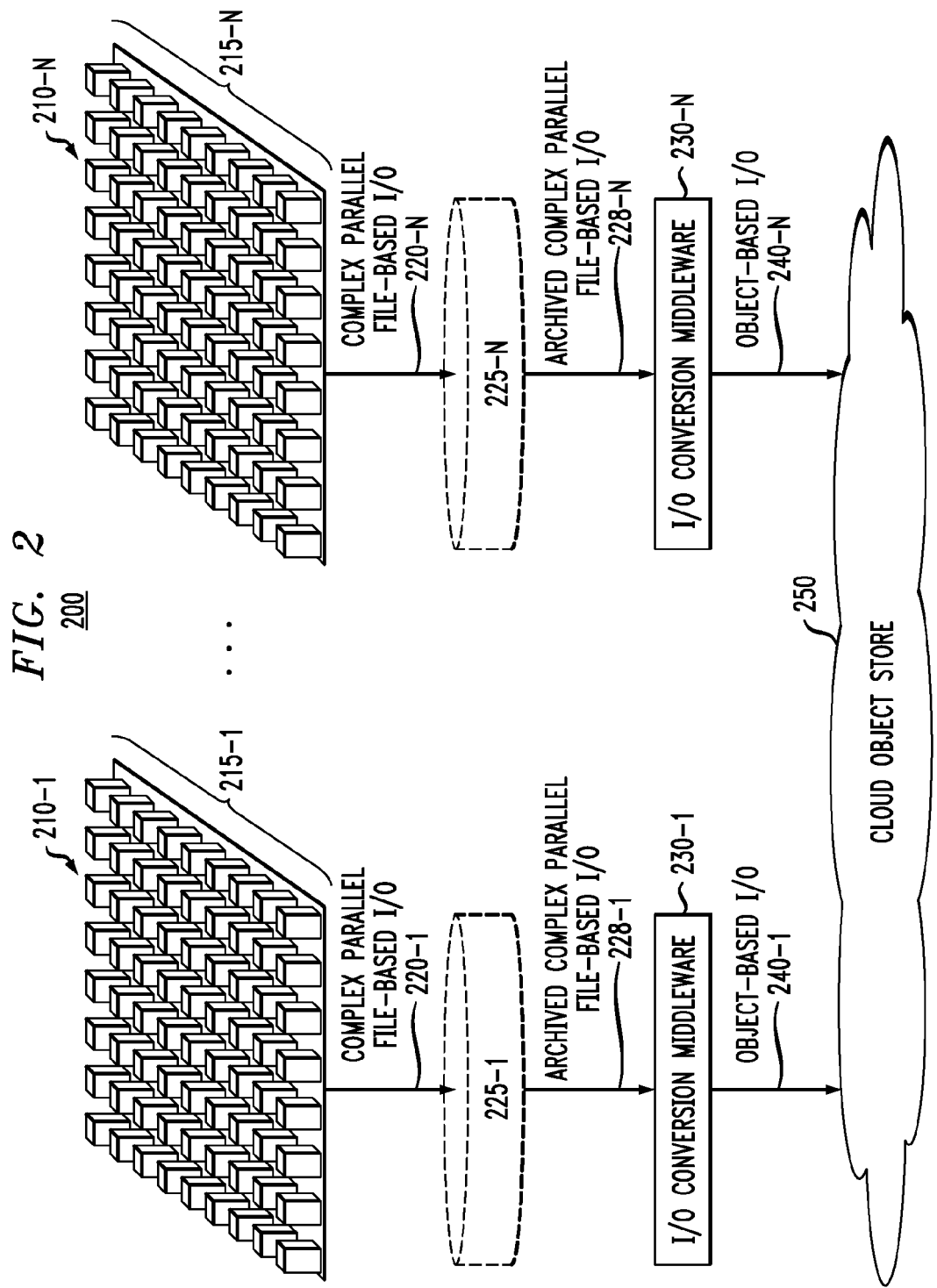
FIG. 2 illustrates a system for the storage of archived data generated by one or more high performance computing applications using cloud storage, in accordance with an aspect of the present invention.

FIG. 2 illustrates a system 200 for the storage of archived data, such as checkpoints and results generated by one or more high performance computing applications using cloud storage, in accordance with an aspect of the present invention. As shown in FIG. 2, one or more high performance computing applications executing on one or more compute node sites 210-1 through 210-N generate complex parallel file-based I/O 220-1 through 220-N, such as a plurality of archived data, such as checkpoints and results, in a similar manner to FIG. 1. The complex parallel I/O 220 is optionally stored in a corresponding parallel file system 225-1 through 225-N associated with the high performance computing application 210-1 through 210-N.

As shown in FIG. 2, the archived complex parallel file-based I/O 228 (either directly from the high performance computing application 210-1 through 210-N or from storage in a corresponding parallel file system 225-1 through 225-N) comprised of the data to be archived is processed by a corresponding I/O Conversion Middleware process 230-1 through 230-N. The I/O Conversion Middleware processes 230 comprise a log structured file system middleware process, such as a Parallel Log-Structured File System (PLFS), as modified herein to provide the features and functions of the present invention. See, for example, John Bent et al., "PLFS: A Checkpoint Filesystem for Parallel Applications," Association for Computing Machinery, SC09 (November 2009), incorporated by reference herein. I/O Conversion Middleware processes 230 are discussed further below in conjunction with FIG. 3.

The log structured file system middleware process 230 can execute, for example, on a burst buffer node or on the corresponding compute node site 210. The burst buffer node can be embodied, for example, as an Active Burst Buffer Appliance (ABBA), commerically available from Los Alamos National Labs (LANL) and EMC Corporation. A burst buffer hardware node ensures that checkpoint performance is not sacrificed in the case where cloud storage might be slower than existing parallel file systems.

As shown in FIG. 2, the I/O conversion middleware process 230 converts the archived complex parallel file-based I/O 228 to a corresponding object-based I/O 240-1 through 240-N. The object-based I/O 240 is provided to a cloud storage application programming interface (API) of a cloud object storage system 250. In one exemplary embodiment, the I/O conversion middleware process 230 comprises a software module for providing the object-based I/O 240 to the cloud storage application programming interface (API).

Figure 3:
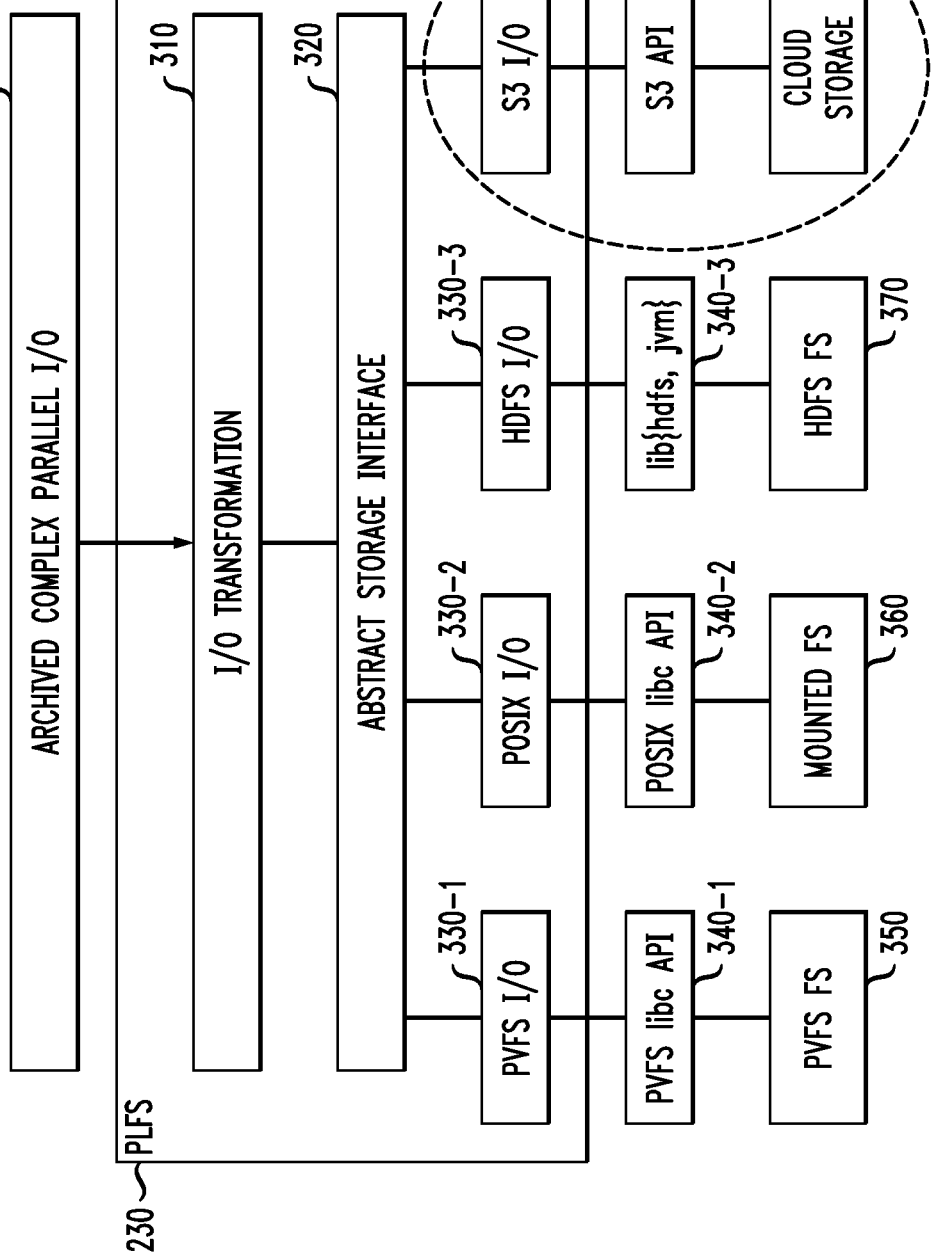
FIG. 3 illustrates the archived data storage of FIG. 2 in further detail.

FIG. 3 illustrates the checkpoint storage 200 of FIG. 2 in further detail. As shown in FIG. 3, the complex parallel file-based I/O 228 is processed by a corresponding I/O Conversion Middleware process 230. The exemplary I/O Conversion Middleware process 230 is embodied as a Parallel Log-Structured File System, as modified herein to provide the features and functions of the present invention.

The exemplary I/O Conversion Middleware process 230 comprises an I/O transformation stage 310 and an Abstract Storage Interface 320 to a plurality of I/O formats. The exemplary Abstract Storage Interface 320 performs file I/O and directory operations. The exemplary Abstract Storage Interface 320 can be implemented as a Virtual C++ class.

For an exemplary set of I/O formats, the exemplary Abstract Storage Interface 320 supports a Parallel Virtual File System (PVFS) I/O format module 330-1, a Portable Operating System Interface (POSIX) I/O format module 330-2, a Hadoop Distributed File System (HDFS) I/O format module 330-3 and a Simple Storage Service (S3) I/O format module 330-4 (provided by Amazon Web Services). It is noted that existing PLFS file systems provide an Abstract Storage Interface 320 to a PVFS I/O format 330-1, a POSIX I/O format 330-2 and an HDFS I/O format 330-3. An existing PLFS file system is extended as described herein to provide an Abstract Storage Interface 320 to an S3 I/O format module 330-4. It is noted that while aspects of the invention are described in conjunction with an exemplary S3 cloud storage protocol, other cloud storage protocols could be employed, as would be apparent to a person of ordinary skill in the art.

Each exemplary format 330-1 through 330-4 communicates with an API 340-1 through 340-3 of the associated file system, such as the PVFS file system 350, Mounted file system 360 (for POSIX) and HDFS file system 370. In the case of a cloud storage system 380, the S3 I/O format 330-4 communicates with an S3 API 340-4.

Since most cloud storage protocols use objects and not files, the exemplary I/O Conversion Middleware process 230 converts a file interface into an object interface. For example, the exemplary I/O Conversion Middleware process 230 converts files to a plurality of Get-Put operations on a set of objects. In an object-based cloud storage system, such as the Amazon S3 system referenced above, a "put" command passes data for an entire object, and a "get" command retrieves the data for an entire object. See, for example, Amazon S3 Tools: Command Line S3 Client Software and S3 Backup (downloadable from http://s3tools.org/usage).

In addition, since a number of cloud storage protocols do not provide directory operations, the exemplary S3 I/O format module 330-4 of the I/O Conversion Middleware process 230 can handle directory operations by returning an error on directory operations; building a namespace in its own private object; and/or embedding full directory paths into the name of each file/object.

Further, since a number of cloud storage protocols do not allow partial file I/O, and entire objects must be read and written, the exemplary S3 110 format module 330-4 of the I/O Conversion Middleware process 230 can handle this internally by buffering entire objects. The Abstract Storage Interface 320 will issue partial read and write operations, and the S3 I/O format module 330-4 will apply partial read and write operations to the buffer. The S3 I/O format module 330-4 will flush an entire object upon a write close and will fetch an entire object upon a read open.

FIGS. 4A and 4B, collectively, illustrate exemplary code 400, 450, 475 for an Abstract Storage Interface 320 used to transform the archived complex parallel file-based I/O 228 of FIG. 2 for archived storage in a storage system, such as the cloud object store 380 of FIG. 3. As shown in FIG. 4A, exemplary code 400 provides an abstract interface to a cloud storage system. As shown in FIG. 4B, exemplary code 450 provides an abstract interface to a storage object/file and exemplary code 475 provides an abstract interface to a storage directory.

Figure 5:
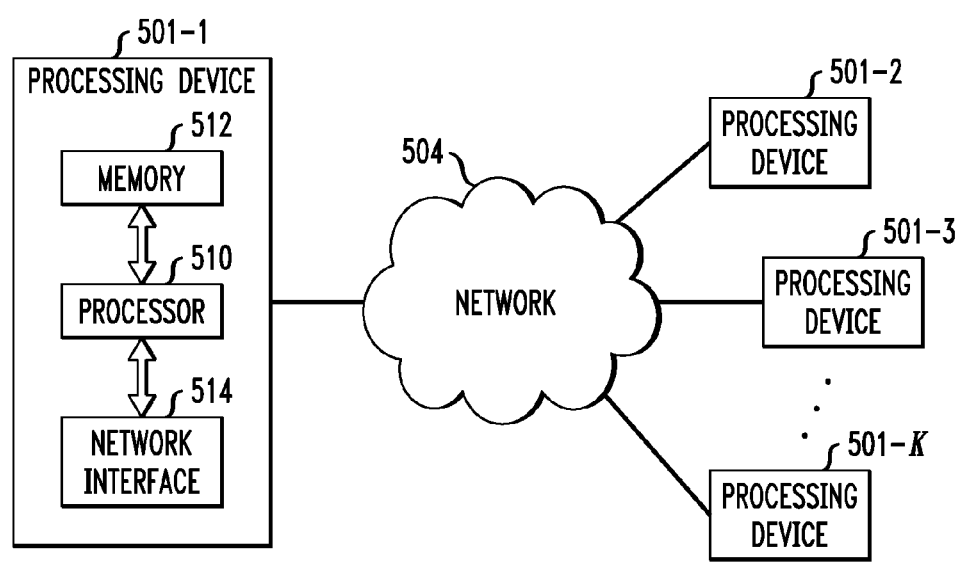
FIG. 5 illustrates an exemplary processing platform in which aspects of the present invention can be employed.

FIG. 5 illustrates an exemplary processing platform in which aspects of the present invention can be employed. The exemplary processing platform 500 comprises a plurality of processing devices, denoted 501-1, 501-2, 501-3, ... 501-K, that communicate with one another over a network 504. The network 504 may comprise any type of network, such as a WAN, a LAN, a satellite network, a telephone or cable network, or various portions or combinations of these and other types of networks.

The processing device 501-1 in the processing platform 500 comprises a processor 510 coupled to a memory 512. The processor 510 may comprise a microprocessor, a microcontroller, an application-specific integrated circuit (ASIC), a field-programmable gate array (FPGA) or other type of processing circuitry, as well as portions or combinations of such circuitry elements, and the memory 512, which may be viewed as an example of a "computer program product" having executable computer program code embodied therein, may comprise random access memory (RAM), read-only memory (ROM) or other types of memory, in any combination.

Also included in the processing device 501-1 is network interface circuitry 514, which is used to interface the processing device with the network 504 and other system components, and may comprise conventional transceivers.

The other processing devices 501 of the processing platform 500 are assumed to be configured in a manner similar to that shown for processing device 501-1 in the figure.

Again, the particular processing platform 500 shown in FIG. 5 is presented by way of example only, and system 200 may include additional or alternative processing platforms, as well as numerous distinct processing platforms in any combination, with each such platform comprising one or more computers, servers, storage devices or other processing devices.

It should again be emphasized that the above-described embodiments of the invention are presented for purposes of illustration only. Many variations and other alternative embodiments may be used. For example, the techniques are applicable to a wide variety of other types of devices and systems that can benefit from the replicated file system synchronization techniques disclosed herein. Also, the particular configuration of system and device elements shown in FIGS. 1-5 can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for storing a plurality of archived files generated by a plurality of processes in a parallel computing system, comprising the steps of:
    obtaining said plurality of archived files from said parallel computing system;
    converting said plurality of archived files to objects using a log structured file system middleware process, wherein said log structured file system middleware process writes modifications sequentially in a log-like structure; and
    providing said objects for storage in a cloud object storage system using a software interface module of said log structured file system middleware process, wherein said software interface module communicates with a cloud storage application programming interface (API) of said cloud object storage system, wherein said log structured file system middleware process is a middleware process between said parallel computing system and said cloud object storage system.

2. The method of claim 1, wherein said plurality of processes are running on a plurality of compute nodes.

3. The method of claim 1, wherein said plurality of archived files comprise one or more of checkpoint files and results generated by said plurality of compute nodes.

4. The method of claim 1, wherein said log structured file system middleware process comprises a Parallel Log-Structured File System (PLFS).

5. The method of claim 1, wherein said log structured file system middleware process executes on a burst buffer node.

6. The method of claim 1, wherein said step of providing said objects for storage in said cloud object storage system further comprises the step of providing said objects to said cloud storage of said cloud object storage system.

7. The method of claim 6, wherein said log structured file system middleware process comprises said software module for providing said objects for storage to said cloud storage API.

8. The method of claim 7, wherein said software module embeds one or more directory paths into a name of each of said objects provided to said cloud storage API.

9. The method of claim 7, wherein said log structured file system middleware process comprises a software module for generating a namespace of said plurality of files.

10. The method of claim 1, wherein said step of converting said plurality of archived files to objects further comprises converting said plurality of archived files to a plurality of Get-Put operations on a set of said objects.

11. The method of claim 1, wherein said log structured file system middleware process processes partial file input/output operations by buffering entire objects in one or more buffers and applying one or more of partial read and write commands using said one or more buffers.

12. A tangible machine-readable recordable storage medium for storing a plurality of archived files generated by a plurality of processes in a parallel computing system, wherein one or more software programs when executed by one or more processing devices implement the steps of the method of claim 1.

13. An apparatus for storing a plurality of archived files generated by a plurality of processes in a parallel computing system, comprising:
    a memory; and
    at least one hardware device operatively coupled to the memory and configured to:

obtain said plurality of archived files;
convert said plurality of archived files to objects using a log structured file system middleware process, wherein said log structured file system middleware process writes modifications sequentially in a log-like structure; and
provide said objects for storage in a cloud object storage system using a software interface module of said log structured file system middleware process, wherein said software interface module communicates with a cloud storage application programming interface (API) of said cloud object storage system, wherein said log structured file system middleware process is a middleware process between said parallel computing system and said cloud object storage system.

14. The apparatus of claim 13, wherein said plurality of processes are running on a plurality of compute nodes.

15. The apparatus of claim 13, wherein said plurality of archived files comprise one or more of checkpoint files and results generated by said plurality of compute nodes.

16. The apparatus of claim 13, wherein said log structured file system middleware process comprises a Parallel Log-Structured File System (PLFS).

17. The apparatus of claim 13, wherein said log structured file system middleware process executes on a burst buffer node.

18. The apparatus of claim 13, wherein said objects are provided for storage in said cloud object storage system by providing said objects to said cloud storage API of said cloud object storage system.

19. The apparatus of claim 13, wherein said plurality of archived files are converted to objects by converting said plurality of files to a plurality of Get-Put operations on a set of said objects.

20. The apparatus of claim 13, wherein said log structured file system middleware process processes partial file input/output operations by buffering entire objects in one or more buffers and applying one or more of partial read and write commands using said one or more buffers.

21. A data storage system for storing a plurality of archived files generated by a plurality of processes in a parallel computing system, comprising:
a processing unit for obtaining said plurality of archived files; converting said plurality of archived files to objects using a log structured file system middleware process, wherein said log structured file system middleware process writes modifications sequentially in a log-like structure; and providing said objects for storage in a cloud object storage system using a software interface module of said log structured file system middleware process, wherein said software interface module communicates with a cloud storage application programming interface (API) of said cloud object storage system, wherein said log structured file system middleware process is a middleware process between said parallel computing system and said cloud object storage system; and
said cloud object storage system for storing said objects.

22. The data storage system of claim 21, wherein said plurality of processes are running on a plurality of compute nodes.

23. The data storage system of claim 21, wherein said plurality of archived files comprise one or more checkpoint files and results generated by said plurality of compute nodes.

24. The data storage system of claim 21, wherein said log structured file system middleware process comprises a Parallel Log-Structured File System (PLFS).

25. The data storage system of claim 21, wherein said log structured file system middleware process executes on a burst buffer node.

* * * * *